2,950,264
Patented Aug. 23, 1960

2,950,264

METAL SALTS COMPLEXED VINYLIDENE AROMATIC-ALDEHYDE COPOLYMERS

Earl C. Chapin, Springfield, and Mary E. Murphy, East Longmeadow, Mass.

No Drawing. Filed Mar. 4, 1958, Ser. No. 718,972

10 Claims. (Cl. 260—23)

This invention relates to a novel class of vinylidene aromatic polymers. More particularly, it relates to vinylidene aromatic-aldehyde copolymers complexed with metal salts.

Vinylidene aromatic polymers have found wide application throughout the plastics industry. More recently, development of copolymers of vinylidene aromatic compounds with other monomers containing reactive groups has greatly increased the breadth of application of vinylidene aromatic polymers. Among such new applications has been the substantial use of these copolymers as surface coating resins, floor polishes, etc.

It is an object of this invention to provide new vinylidene aromatic polymers.

Another object is the provision of novel vinylidene aromatic polymers for use as surface coating resins, many of which possess marked oligodynamic properties.

A further object is the provision of novel and stable metal salt complexed copolymers of vinylidene aromatic monomers and alpha, beta ethylenically unsaturated aldehydes.

These and other objects are attained by reacting an inert organic solvent solution of a copolymer of a vinylidene aromatic monomer and an alpha, beta ethylenically unsaturated aldehyde with a metal salt until an appreciable proportion of the carbonyl groups of the copolymer are complexed with the metal salt.

The following examples are given in illustration of the invention and are not intended as limitations thereof. Where parts are mentioned they are parts by weight.

Example I

One hundred and fifty parts of an alphamethylstyrene-acrolein copolymer containing 50 mol percent acrolein are dissolved in 300 parts of dioxane. Fifty parts of copper II acetate are added to the polymer solution and maintained in suspension therein with stirring. Reaction is effected at room temperature, circa 20° C. After 3 hours the solution is poured into 3 liters of water to precipitate a hard, clear, blue-green colored polymeric material. Analysis shows this product to be the original alphamethylstyrene-acrolein copolymer containing about 8.2% by weight of copper II acetate complexed therewith.

Example II

Twenty-five parts of a styrene-methacrolein copolymer containing 30 mol percent methacrolein are dissolved in 150 parts of benzene. Five parts of aluminum acetate are added to the copolymer solution and are maintained in suspension therein with stirring. The mixture is heated to, and maintained at reflux temperature of 80° C. for about 3 hours after which the mixture is cooled. The excess aluminum acetate is filtered from the solution, and the benzene solvent is removed by distillation leaving a hard, clear, colorless polymeric material. Analysis shows this product to be the original styrene-methacrolein copolymer containing about 7% by weight of aluminum acetate complexed therewith.

The copolymers of this invention are copolymers of acrolein, methacrolein, crotonaldehyde or cinnimaldehyde with certain vinylidene aromatic monomers. The vinylidene aromatic monomers so employed are styrene, alphamethylstyrene and the mono- and di-ring-substituted methyl and chloro derivatives thereof; e.g., p-chlorostyrene, 2,5-dichlorostyrene, m-methylstyrene, 2,4-dimethylstyrene, p-chloro-alphamethylstyrene, etc. For the purpose of this invention the copolymers must contain from 10–50 mol percent of the aldehyde compound.

The metal salts of this invention are the salts of complexing metal ions and saturated or unsaturated fatty acids. The complexing metal ions combined in these salts are copper II, iron II and III, cobalt II, manganese II and IV, nickel II, chromium III, cerium, zinc, aluminum, lanthanum and cadmium. The roman numerals placed after the metal, e.g., copper, iron, etc., refer to the valence state of these metals in accordance with recently accepted nomenclature. Combinations of these metal ions with saturated fatty acids containing from 1–18 carbon atoms may be employed. Examples of such saturated fatty acid salts are the formates, acetates, butyrates, laurates, palmitates, stearates, etc. Alternatively, salts of these metal ions with unsaturated fatty acids containing from 10–18 carbon atoms may be employed, e.g., the decylenates, palmitoleates, oleates, ricinoleates, linoleates, linolenates, etc. In a preferred embodiment, salts of the above metal ions with the fatty acids derived from drying or semi-drying oils, containing mixtures of these unsaturated fatty acids are used. Such oils include cottonseed oil, soybean oil, linseed oil, dehydrated castor oil, safflower oil, etc.

The copolymer is dissolved in an inert organic solvent such as dioxane, benzene, toluene, xylene, etc. or mixtures thereof with mineral spirits or butanol. The metal salt is next added to the copolymer solution in powdered form. However, those metal salts that are water-soluble may be added in aqueous solution if desired. Reaction occurs at room temperature but is facilitated by maintaining the metal salt in suspension in the copolymer solution. The use of higher temperatures will also accelerate the reaction, 100° C. being a practical upper limit above which no particular advantage is obtained.

Metal salt complexed vinylidene aromatic-aldehyde copolymers containing from 5–50% by weight of the metal salt are readily obtainable by the above procedure depending upon the weight proportions of metal salt and copolymer charged. Substantially total reaction can be obtained, within the above limits, resorting to elevated temperatures and extended reaction periods only to obtain the more highly complexed products. Alternatively, more favorable reaction equilibria may be obtained using an excess of metal salt, terminating the reaction when desired by removing (e.g., by filtration) the excess metal salt from the reaction system. The quantity of metal salt complexed with the copolymer is readily determined by quantitative measurement of the metal in the product.

The metal salt complexed vinylidene aromatic-aldehyde copolymer may be recovered by conventional techniques such as evaporation of the solvent. In another method, the final solution is poured into a large excess of a non-solvent which is miscible therewith, e.g., water, methanol, etc., to precipitate the complexed copolymer. However, for many applications these complexed copolymers are used directly in solution as obtained.

In great part, these complexed copolymers possess physical properties similar to those of their respective parent vinylidene aromatic-aldehyde copolymers. However several of the complexing metal ions used, i.e., copper II, iron II and III, cobalt II, nickel II, zinc and cadmium, possess marked oligodynamic properties which they impart to the complexed copolymer. Hackh's Chemical Dictionary, third edition, defines oligodynamic as the inhibition of bacteria due to the presence of certain metals. In tests, complexed copolymers containing these metal salts destroyed staphylococci cultures. These complexed copolymers also exhibit substantial adhesiveness and most important, many of them may be cross-linked or hardened into tough, flexible, transparent surface-coating films.

*Example III*

Twenty-five parts of an alphamethylstyrene-acrolein copolymer containing 50 mol percent acrolein are dissolved in 100 parts of xylene. Twenty-five parts of an iron III salt of soya acids are charged together with 2 drops of cobalt naphthenate. The mixture is vigorously agitated at room temperature, circa 20° C., for about 15 minutes and is then cast as a 0.003 inch film on a clean glass plate. After air-drying the film at 150° C. for about 15 minutes, a transparent surface coating film, impervious to attack by benzene, xylene or 10% aqueous caustic soda solution, is obtained. The iron III-soya acids salt cannot be leached out of the film.

*Example IV*

Example III is repeated substituting a copper II salt of linseed oil acids for the iron III salt of soya acids used therein. Additionally, 4 grams of ultramine blue pigment are charged to the mixture. A 0.003 inch film is cast on a clean glass plate and is permitted to dry overnight at room temperature. A tough, solvent-resistant paint film possessing marked oligodynamic properties is obtained. The copper II-linseed acids salt cannot be leached from the paint film.

The complexed copolymers used as surface-coating films are those prepared by reacting any of the above vinylidene aromatic copolymers with a metal salt of the 10–18 carbon atom unsaturated fatty acid or with a metal salt of the fatty acid derivatives of drying or semi-drying oils containing mixtures of such unsaturated fatty acids. These metal salts of unsaturated fatty acids are fully described above.

When preparing surface-coating compositions the vinylidene aromatic-aldehyde copolymer, metal salt and solvent are combined in the following proportions by weight:

| | Parts |
|---|---|
| Vinylidene aromatic-aldehyde copolymer | 50–80 |
| Metal salt of unsaturated fatty acids | 20–50 |
| Solvent to bring to 20–60% solids by weight. | |

The copolymer solvent employed should be volatile, e.g., xylene, xylene-butanol, xylene-mineral spirits, etc. Films or paints of the above formulation applied to glass, metal, wood, etc. surfaces may be air-dried at ambient temperatures. However, those containing salts derived from slower drying oils may require air-drying at elevated temperatures, e.g., 150° C. Conventional driers such as cobalt naphthenate, manganese naphthenate, lead naphthenate, etc. may optionally be employed to accelerate curing, or drying, of the film.

Surface coating films may also be prepared from solutions of vinylidene aromatic-aldehyde copolymers complexed with the metal salts of 1–18 carbon atom saturated fatty acids by adding thereto an unsaturated fatty acid of the class previously described or the fatty acid derivatives of the drying or semi-drying oils heretofore described.

*Example V*

Twenty-five parts of the copper II acetate complex of alphamethylstyrene-acrolein copolymer prepared in Example I are dissolved in 100 parts of xylene. Twenty parts of the fatty acids derived from dehydrated castor oil are added together with 2 drops of cobalt naphthenate. The mixture is vigorously agitated at room temperature, circa 20° C. for about 15 minutes and is then cast as a 0.003 inch film on a clean glass plate. After air-drying the film at 150° C. for about 15 minutes, a transparent surface coating film, impervious to attack by benzene, xylene or 10% aqueous caustic soda solution is obtained.

Compositions containing the complexed copolymers of this invention may be modified with such conventional additives as dyes, pigments, fillers, waxes, etc.

The complexed copolymers of this invention may be used as surface-coating films and paints as has been shown. The marked oligodynamic properties of certain of the complexing metal ions therein make them attractive as marine paints which resist the formation of barnacles. Other uses include adhesives, textile binders, etc.

It is obvious that many variations may be made in the products and processes set forth above without departing from the spirit and scope of this invention.

What is claimed is:

1. A stable metal salt complexed copolymer comprised of a copolymer of from 50–90 mol percent of a vinylidene aromatic monomer and from 50–10 mol percent of an alpha, beta ethylenically unsaturated aldehyde, said copolymer containing from 5–50% by weight, based upon the weight of said copolymer, of a metal salt complexed with the carbonyl groups thereof; said vinylidene aromatic monomer being selected from the group consisting of styrene, alphamethylstyrene and the mono- and di-ring-substituted methyl and chloro derivatives thereof; said alpha, beta ethylenically unsaturated aldehyde being selected from the group consisting of acrolein, methacrolein, crotonaldehyde and cinnimaldehyde; said metal salt being a salt of an aliphatic fatty acid selected from the group consisting of saturated fatty acids containing from 1–18 carbon atoms, unsaturated fatty acids containing from 10–18 carbon atoms and mixtures thereof derived from drying and semi-drying oils and a metal selected from the group consisting of copper II, iron II and III, cobalt II, manganese II and IV, nickel II, chromium III, cerium, zinc, aluminum, lanthanum and cadmium.

2. A stable metal salt complexed copolymer as in claim 1 wherein the vinylidene aromatic monomer is styrene and the alpha, beta ethylenically unsaturated aldehyde is methacrolein.

3. A stable metal salt complexed copolymer as in claim 1 wherein the vinylidene aromatic monomer is alphamethylstyrene and the alpha, beta ethylenically unsaturated aldehyde is acrolein.

4. A process for preparing stable metal salt complexed copolymers wherein an inert organic solvent solution of a copolymer of from 50–90 mol percent of a vinylidene aromatic monomer and from 50–10 mol percent of an alpha, beta ethylenically unsaturated aldehyde is reacted with a metal salt at a temperature of from about room temperature to 100° C. until from 5–50% by weight, based upon the weight of said copolymer, of said metal salt is complexed with the carbonyl groups of said copolymer; said vinylidene aromatic monomer being selected from the group consisting of styrene, alphamethylstyrene and the mono- and di- ring-substituted methyl and chloro derivatives thereof; said alpha, beta ethylenically unsaturated aldehyde being selected from the group consisting of acrolein, methacrolein, crotonaldehyde and cinnimaldehyde; said metal salt being a salt of an aliphatic fatty acid selected from the group consisting of saturated fatty acids containing from 1–18 carbon atoms, unsaturated fatty acids containing from 10–18 carbon atoms and mixtures thereof derived from drying and semi-drying oils and a metal selected from the group consisting of copper II, iron II and III, cobalt II, manganese II and IV, nickel II, chromium III, cerium, zinc, aluminum, lanthanum and cadmium.

5. A process as in claim 4 wherein the vinylidene aromatic monomer is styrene and the alpha, beta ethylenically unsaturated aldehyde is methacrolein.

6. A process as in claim 4 wherein the vinylidene aromatic monomer is alphamethylstyrene and the alpha, beta ethylenically unsaturated aldehyde is acrolein.

7. A surface coating composition comprising (1) from 50–80 parts by weight of a copolymer of from 50–90 mol percent of a vinylidene aromatic monomer and from 50–10 mol percent of an alpha, beta ethylenically unsaturated aldehyde, (2) from 20–50 parts by weight of a metal salt complexed with the carbonyl groups of said copolymer and (3) a volatile solvent for said copolymer in proportions such that the overall surface coating composition contains from 20–60% solids by weight; said vinylidene aromatic monomer being selected from the group consisting of styrene, alpha-methylstyrene and the mono- and di- ring-substituted methyl and chloro derivatives thereof; said alpha, beta ethylenically unsaturated aldehyde being selected from the group consisting of acrolein, methacrolein, crotonaldehyde and cinnimaldehyde; said metal salt being a salt of an unsaturated fatty acid selected from the group consisting of unsaturated fatty acids containing from 10 to 18 carbon atoms and mixtures thereof derived from drying and semi-drying oils and a metal selected from the group consisting of copper II, iron II and III, cobalt II, manganese II and IV, nickel II, chromium III, cerium, zinc, aluminum, lanthanum and cadmium.

8. A surface coating composition as in claim 7 wherein the metal salt is the copper II salt of soybean fatty acids.

9. A surface coating composition as in claim 7 wherein the metal salt is the aluminum salt of soybean fatty acids.

10. A surface coating composition as in claim 7 wherein the metal salt is the iron III salt of soybean fatty acids.

References Cited in the file of this patent

UNITED STATES PATENTS 2,651,624    Swart                 Sept. 8, 1953

FOREIGN PATENTS 545,765    Great Britain           Dec. 31, 1941